Sept. 10, 1935.  C. L. EKSERGIAN ET AL  2,014,247

WHEEL MOUNTING

Filed Aug. 27, 1930

INVENTOR.
JOHN P. TARBOX
CAROLUS L. EKSERGIAN
BY John P. Tarbox
ATTORNEY.

Patented Sept. 10, 1935

2,014,247

UNITED STATES PATENT OFFICE 2,014,247

WHEEL MOUNTING

Carolus L. Eksergian, Detroit, Mich., and John P. Tarbox, Philadelphia, Pa., assignors to Budd Wheel Company, Philadelphia, Pa., a corporation of Pennsylvania Application August 27, 1930, Serial No. 478,028

1 Claim. (Cl. 301—36)

This invention relates to vehicle wheels and more particularly to dual disc wheels adapted for use on heavy vehicles such as trucks, motor stage coaches and the like, although the invention is applicable to other types of wheels.

One type of dual wheel now in general use consists in a pair of discs having clamping surfaces adjacent their inner portions through which there extends a plurality of bolt holes. By means of these bolt holes the discs are adapted to be clamped to each other and to a radial flange formed on the hub, also having bolt holes extending therethrough. The discs have radial portions which diverge outwardly from each other a degree determined by the size of rims to be carried and the outer periphery of these discs are flanged to permit attachment of the rim constructions. It is to this type of wheel construction in particular that the present invention applies.

Various tests and general experience have demonstrated that in this type of wheel, the greatest weakness occurs in the region of the bolt hole circle, a fact not surprising because in this region occurs the only detachable connection for the wheel. Because of the great stresses encountered at the bolt hole region, discs having an adequate bearing thickness have been provided thus necessitating, due to manufacturing limitations thick outer portions, and consequently a waste of metal results. Furthermore, because of the provision of thick rigid sections there is a tendency for the discs to work loose thereby causing undue wear of the bolts and bolt holes and preventing efficient operation of the vehicle wheel.

Accordingly it is an object of the present invention to provide a dual wheel in which there is a certain amount of resiliency in the bolt hole region to permit the use of discs of moderate thickness and also to aid in keeping the discs tightly clamped together against the hub flange.

A further object of the invention is to provide a tapered wheel of light weight and superior strength which will be easier to roll than those now commonly in use.

Figure 1:
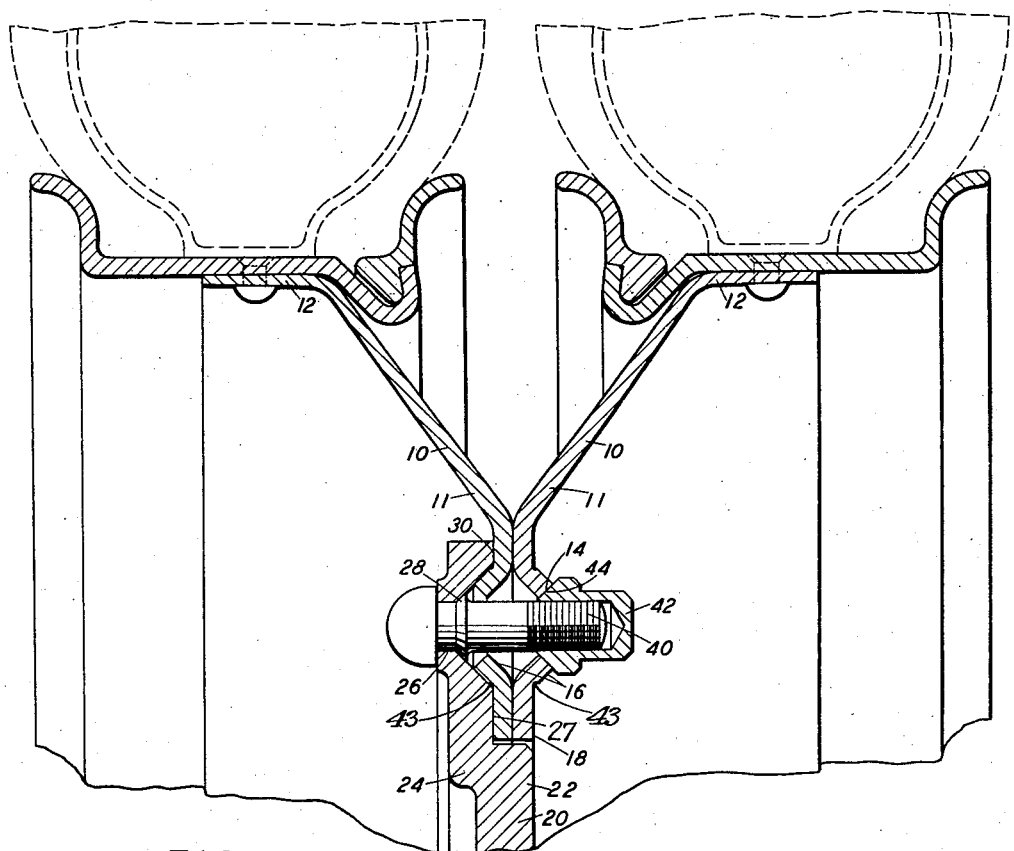
Figure 2:
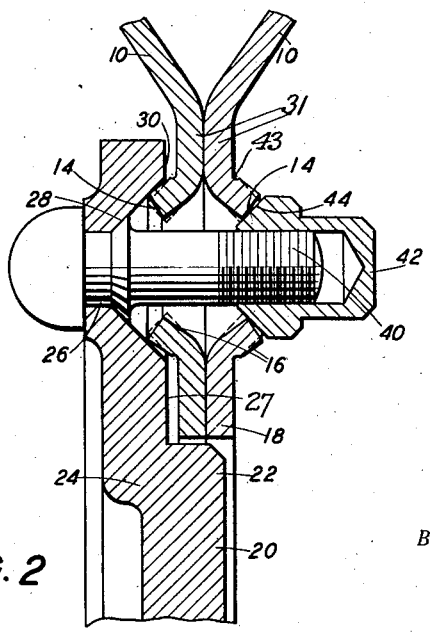

With these and other objects in view, which will more readily appear as the nature of the invention is better understood, the same consists in the novel construction, combination and arrangement of parts shown in the accompanying one sheet of drawing, in which:

Figure 1 is a sectional view of a wheel manufactured in accordance with the present invention, taken in a radial plane through one of the bolt holes, and Figure 2 is an enlarged sectional view of the disc attaching means.

In both of the above described views, like characters of reference are employed to designate like parts throughout.

Inasmuch as the inner and outer discs of the present wheel construction are identical, a simultaneous description of both will be made. Each of the discs, 10, comprises a body portion 11, and a flange 12, riveted or otherwise secured to the rim. These discs are of the demountable wheel type and are provided with bolt holes 14, and oppositely turned inclined bolt hole flanges 16, bordering the bolt holes. The flanges 16, and the extreme inner portion, 18, of the discs are comparatively thick as the greatest stress occurs in the assembled wheel at this region. The radial body portion 11, of the discs, tapers slightly outwardly and the flange for attachment to the rim is comparatively thin. The hub flange is shown at 20 and comprises a radial portion 22, and an offset portion 24, having a plurality of bolt holes 26 extending therethrough, provided with conical seats 28 against which the flange 16, of the inner disc is adapted to be nested. The offset portion 24, is provided with a flat shoulder 27, against which the portion 18 of the inner disc is adapted to bear. The offset portion 24, is also provided with a surface 30, outwardly of the bolt holes against which the radially inner body portion of the inner disc is adapted to bear.

In the use of these discs as a dual wheel, they are arranged back to back with the radially inner vertical body portions abutting against each other with the flanges 16 directed outwardly. With the discs oriented in this manner, either disc may be used as the inner and the other as the outer disc of the dual wheel. The flange 16, of the disc employed as the inner disc is adapted to be nested against the conical surface 28, of the bolt holes in the hub flange. The bolt 40 extends through the hole in the hub flange and through the holes in the discs, and a nut 42 having a conical seat 44 is screwed on the bolt 40 with the conical seat 44 bearing against the end of the flange 16 to clamp the vertical radially inner body portions of the discs together and to clamp the same against the surface 30 to provide a rigid construction.

The disc surface is made re-entrant at 43 as clearly appears in Figs. 1 and 2 to provide clearance between the conical surface 16 and the radial surface 31 whereby the seating of both is guaranteed when the nuts are forced all the way home.

In order to permit reflexing of the discs and to secure rigidity of attachment of the same to the hub flange, the diverted flanges 16 are preformed at an angle from the inner body portion less than the angle between the conical seat 28 and the flat surface 30, as clearly shown in Figure 2. Thus when the bolt and nut assembly is properly positioned, the conical seat 28, acting as a cam, bears against the edge of the flange 16, in the inner disc and causes said flange to securely abut the conical seat. In a like manner, the surface of the nut 42 engages the end of the flange 16, on the outer disc, and acting as a cam, the extreme inner edge of the flange 16 is brought to bear against the conical surface so that both discs are secured in position under tension.

The invention is not to be limited to the exact arrangement of parts shown in the accompanying sheet of drawings or described in this specification as various modifications are contemplated. Only insofar as the invention is pointed out in the appending claim is the invention to be limited.

What we claim is:

A dual wheel body mounting having a plurality of identical metal discs having oppositely turned conically formed bolt hole centering and seating flanges having reversely conically truncated portions at the bolt holes, a hub flange having bolt hole flange seating portions of conical form adapted to receive and seat the bolt hole seating flanges of one of the discs by engagement with the external walls of the cone, and bolting on means provided with a conical shoulder adapted to engage the truncated portions of the bolt hole seating flanges of the other disc and thereby to clamp the outer disc directly to the face of the inner and therethrough to clamp the bolt hole seating flanges of the inner disc upon the conical seats in the hub, the angularity of the conical flanges being acute with respect to the depressions in the hub plate, and the angularity of the truncated portions of the flanges being obtuse with reference to the conical nuts.

JOHN P. TARBOX.
CAROLUS L. EKSERGIAN.